(12) United States Patent
Asante-Nyamekye

(10) Patent No.: US 12,134,082 B2
(45) Date of Patent: Nov. 5, 2024

(54) ULTRA-LOW SURFACE CHARGE BIOGENIC SILICA FILTRATION MEDIA

(71) Applicant: EP MINERALS, LLC, Reno, NV (US)

(72) Inventor: George Asante-Nyamekye, Reno, NV (US)

(73) Assignee: EP Minerals LLC, Reno, NV (US)

(*) Notice: Subject to any disclaimer, the term of this patent is extended or adjusted under 35 U.S.C. 154(b) by 248 days.

(21) Appl. No.: 17/142,416

(22) Filed: Jan. 6, 2021

(65) Prior Publication Data

US 2022/0212160 A1 Jul. 7, 2022

(51) Int. Cl.
| | |
|---|---|
| B01J 20/14 | (2006.01) |
| B01J 20/04 | (2006.01) |
| B01J 20/28 | (2006.01) |
| B01J 20/30 | (2006.01) |
| C02F 1/28 | (2023.01) |

(52) U.S. Cl.
CPC ............ *B01J 20/14* (2013.01); *B01J 20/041* (2013.01); *B01J 20/28011* (2013.01); *B01J 20/3078* (2013.01); *C02F 1/281* (2013.01)

(58) Field of Classification Search
CPC .... B01J 20/14; B01J 20/141; B01J 20/28011; B01J 20/3078; B01J 20/041; B01J 20/3021; B01J 20/3085; C02F 1/281
See application file for complete search history.

(56) References Cited

U.S. PATENT DOCUMENTS

| | | | |
|---|---|---|---|
| 2,693,456 A | 11/1954 | Fennell | |
| 3,013,981 A | 12/1961 | Riede | |
| 3,600,329 A | 8/1971 | Enriquez et al. | |
| 4,325,844 A * | 4/1982 | Olmsted, Jr. | ............ B01J 20/14 502/9 |
| 5,656,568 A | 8/1997 | Shiuh et al. | |
| 5,878,374 A | 3/1999 | Buchanan et al. | |
| 6,464,770 B1 | 10/2002 | Palm et al. | |
| 6,653,255 B2 | 11/2003 | Shiuh et al. | |
| 8,410,017 B2 * | 4/2013 | Nyamekye | ............... B01J 20/14 423/325 |
| 10,913,049 B2 * | 2/2021 | Fleming | .................... A23L 2/80 |
| 2001/0023233 A1 * | 9/2001 | Shiuh | ....................... B01J 20/14 502/412 |
| 2014/0000487 A1 * | 1/2014 | Wang | .................. B01J 20/28004 106/482 |
| 2018/0263263 A1 * | 9/2018 | Fleming et al. | ........... A23L 2/80 |
| 2019/0351355 A1 * | 11/2019 | Nyamekye | ............. B01D 39/06 |

FOREIGN PATENT DOCUMENTS

| | | | |
|---|---|---|---|
| EP | 3365098 A1 | 8/2018 | |
| JP | 2018094477 A * | 6/2018 | ............... B03D 1/02 |

OTHER PUBLICATIONS

Wu et al. Water Sci. and Tech Water Supply 2011, 11, 159-165 (Year: 2011).*
Franca et al. Mining, Metallurgy and Exploration 2003, 20, 42-46 (Year: 2003).*

* cited by examiner

*Primary Examiner* — Brian D Walck
*Assistant Examiner* — Jordan W Taylor
(74) *Attorney, Agent, or Firm* — The Webb Law Firm

(57) ABSTRACT

A diatomite filtration product includes flux-calcined diatomaceous earth, wherein the diatomite filtration product has: (1) an intricate and porous structure of diatomite, (2) a zeta potential in a range of from about −1.0 mV to about −6.0 mV within a pH range of from about 3.0 to about 8.0, and (3) a centrifuged wet density in a range of from about 0.176 g/ml to about 0.256 g/ml.

8 Claims, 2 Drawing Sheets

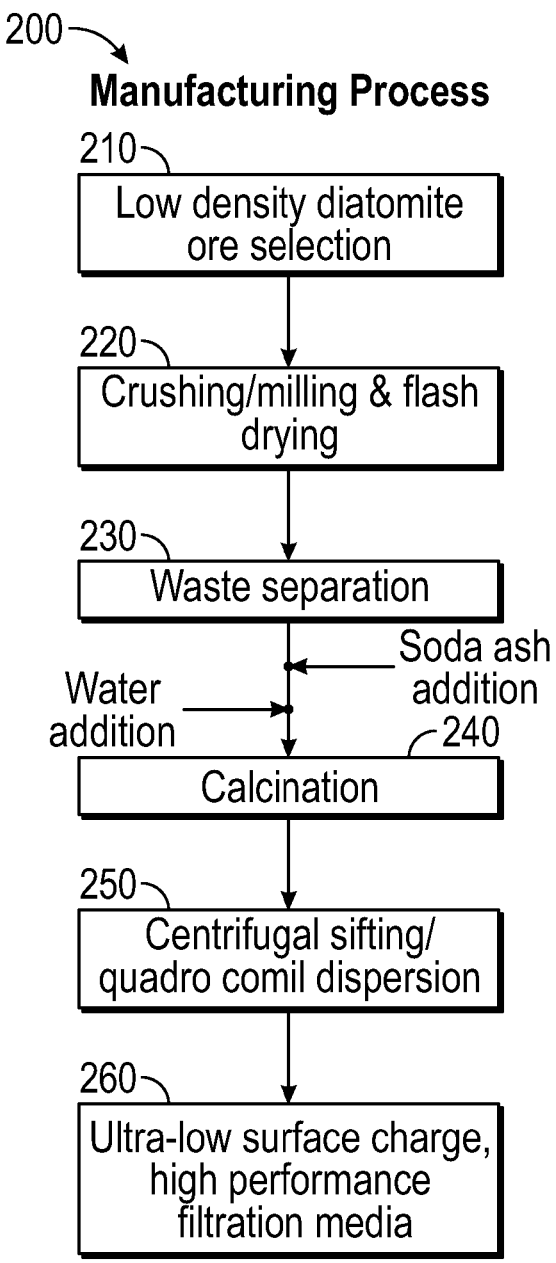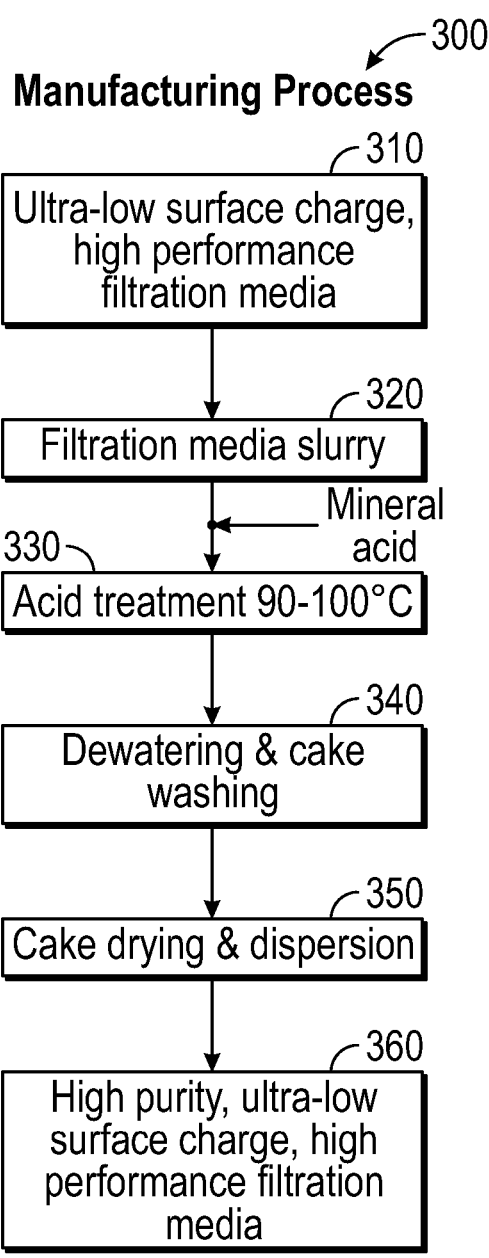
FIG. 2A
FIG. 2B

ULTRA-LOW SURFACE CHARGE BIOGENIC SILICA FILTRATION MEDIA

TECHNICAL FIELD

The present disclosure generally relates to silica filtration products obtained from the flux-calcination of diatomaceous earth. More particularly, the present disclosure relates to ultra-low surface charge biogenic silica filtration products, applicable in the fields of the life sciences and electronic chemicals, where low surface charge filter aids are desired in the filtration separation of fluids and liquids.

BACKGROUND

Diatoms belong to any member of the algal class Bacillariophyceae, with about 12,000 distinct species found in sedimentary deposits in lake (lacustrine origin) and ocean (marine origin) habitats. The diatom cells have a unique feature of being enclosed within a cell wall of amorphous, hydrated biogenic silicon dioxide (silica) called a frustule. These frustules, considered to be in the opal-A phase of silica mineralogy, show a wide diversity in form, but are usually almost bilaterally symmetrical. Because they are composed of silica, an inert material, diatom frustules remain well-preserved over vast periods of time within geologic sediments.

Also deposited with the diatom fossils during their formation are organic contaminants and other minerals, such as clays, volcanic ash, calcite, dolomite, and feldspars. Silica sand in the form of quartz, a form of crystalline silica, may also be deposited in the formation even though the diatomite frustules do not by themselves contain any crystalline silica. It is common to find quartz in marine deposits of diatomite, but some lacustrine deposits of diatomite are free of quartz or contain quartz grains that are easily liberated by milling and drying, followed by separation using mechanical air classification. Quartz grains may also be formed over time as a result of phase conversion from opal-A silica. Namely, following the death of the diatom, the opal-A phase can become partially dehydrated and, in a series of stages, convert from opal-A to other forms of opal with more short-range molecular order and containing less water of hydration, such as the opal-CT and opal-C phases. Over very long periods of time and under suitable conditions, opal-CT can convert to quartz.

The amorphous silica of diatomite, present in the form of opaline diatom skeletons, may also contain alumina, iron, alkali metals and alkali-earth metals. Typical commercial diatomite ores, as determined on an organic-free basis, may show a chemical analysis of silica in the range of about 80 to about 90+ wt.-%, alumina ($Al_2O_3$) in the range of about 0.6 to about 8 wt.-%, iron oxide ($Fe_2O_3$) in the range of about 0.2 to about 3.5 wt.-%, alkali metal oxides such as $Na_2O$ and MgO in an amount of less than about 1 wt.-%, CaO in the range of about 0.3 to about 3 wt.-%, and minor amounts of other impurities, such as $P_2O_5$ and $TiO_2$, for example. In selected deposits, however, the silica concentration may be as high as about 97 wt.-% $SiO_2$.

In commercial grade ores, the unique fine porosity of frustules in diatomaceous earth, a mineral composed of fossil diatoms, provides for certain product properties, including high surface area, low bulk density, and high absorptive capacity. The intricate pore structure of diatomaceous earth ore, which is composed of macropores, mesopores, and micropores, provides for the wetting and high absorptive capacity necessary in certain formulations involving the use of diatomite products.

For example, a combination of the chemical stability derived from the inert silica composition and the high porosity of the frustules make diatomaceous earth useful in commercial filtration applications. Diatomite products have been used for many years in solid/liquid separation (filtration) in several industries, including beverages (for example beer, wine, spirits, and juice), oils (fats, petroleum), waters (swimming pools, drinking water), chemicals (dry cleaning fluid, $TiO_2$ additives), ingestible pharmaceuticals (antibiotics), metallurgy (cooling fluids), agro-food intermediates (amino acid, gelatin, yeast), and sugars.

Processing of Commercial Grade Diatomite Ores

As initially noted above, diatomite products are obtained from the processing of diatomaceous earth ores. Diatomaceous earth ore may include up to about 70% free moisture and various organic and inorganic substances. Thus, before using diatomite in filtration processes, the feed material is taken through conditioning processes that may include some or all of the following unit operations: crushing, milling, drying, heavy minerals separation, calcining, and grit separation. For example, a diatomite ore may be crushed, milled, and flash dried to remove moisture and heavy minerals waste to produce natural filter aids (if the feed does not contain significant amounts of organic compounds and extractable metals). In other instances, a diatomite feed may be milled, flash dried to remove moisture, and calcined to drive off organic contaminants and convert soluble inorganic substances into more inert oxides, silicates, or aluminosilicates.

FIG. 1 shows a flow diagram for a process 100 used in a typical diatomite production facility that manufactures fast flow rate filtration media (and optionally functional filler by-products) utilizing low-impurity diatomite ore as feed. The process begins (block 102) with the selection of the high-grade, low-impurity diatomaceous earth ore from the mine, which typically has a moisture content in the range of about 30 wt.-% to about 60 wt.-%.

Next, the manufacturing process 100 at the production plant involves the crushing of the feed ore to prepare it for drying. The most economical and practical means of drying natural diatomite ores is through the simultaneous milling and flash drying (block 104) of the feed material, which results in the deagglomeration of the consolidated material and removal of moisture to about 2 to about 10 wt.-%. Flash drying may involve single-stage or double-stage processing. Single-stage flash drying processes may incorporate recycling of part of the dried material into the moist feed material to reduce the moisture content of the feed entering the dryer to ensure the moisture target of the product is achieved in a single pass. Alternatively, a single-stage flash dryer may incorporate a static cone classifier where partially dried particles are classified out of the dryer discharge material and returned to the feed entering the dryer. Double-stage flash drying involves either two stages of simultaneous milling and drying of the feed material or a first stage of simultaneous milling and drying and a second stage of pneumatic hot air conveyance drying. The use of an inline static classifier provides for a dried product with minimum particle degradation and therefore results in a lighter density material than the double-stage flash drying system or single-stage recycling system, because the retention time of particles in the process in minimized.

Next, physical beneficiation of the feed to remove heavy minerals and other waste impurities (block 106) is effected by employing different forms of mechanical air classifiers.

Crystalline silica minerals, such as quartz, can be removed during this stage of the process 100. Heavy minerals such as sand, chert, and other particles are also separated. The beneficiation block 106 helps to remove grits from the feed ore but does not significantly impact the chemistry and density of the feed material.

Next, a fluxing agent, often soda ash (sodium carbonate), is pneumatically blended into the beneficiated powder (block 150) and then collected into a feed bin to provide for a consistent feed rate of material into a rotary kiln for thermal sintering of the powder (also, referred to as flux-calcination) (block 108). This thermal treatment results in the combustion and removal of organic matter in the ore, aids in the agglomeration of finer and coarser particles, and reduces product surface area through the loss of some porosity, with a resultant increase in material permeability. The flux-calcination block 108 is carried out in a temperature range of about 870° C. to about 1250° C. and partially or fully dehydrates the naturally-occurring hydrated amorphous silica structure of the diatomite. Calcination is carried out by the thermal treatment of the diatomaceous earth ore in a rotary kiln or rotary calciner.

The kiln discharge for the flux-calcined material is usually agglomerated and must be taken through dispersion fans to generate fine diatomite powder that usually shows a very broad particle size distribution. As such, in order to produce a filter aid product that is acceptable for filtration applications, the process 100 continues with the powder being subjected to mechanical or air classification (block 110) to remove about 10 to about 30 wt.-% of the finer fraction as functional filler product (block 112) in a baghouse, and the coarser fraction is collected in a cyclone as a filter aid (block 114) with significantly enhanced permeability. Optionally, very coarse particles may be further dispersed and classified to control the particle size requirement of the filter aid fraction.

Conventional Diatomite Filtration Media

Conventional diatomite filter aids are inorganic powders and are distinguished from all other fine natural grained silica by their low bulk densities, high brightness, and intricate and porous structure of the diatom frustules that give diatomite products unique commercial value in filtration applications. Diatomite products are produced to meet certain permeabilities, measured in Darcy units, which is a measure of the flow of liquid through a standard amount of filter cake under standard conditions. This is achieved through the thermal sintering of the natural diatomite powder with the use of fluxing agents (flux-calcination), typically soda ash (sodium carbonate), which significantly increases the permeability of the filtration media by reducing the surface area from about 30 m$^2$/g to about less than 3 m$^2$/g. Flux-calcined commercial diatomite products have permeabilities ranging from about 500 millidarcy to about 10,000 millidarcy, with typical centrifuged wet cake densities in the range of from about 0.29 g/ml to about 0.45 g/ml. TABLE 1, below, lists typical flux-calcined diatomite filtration products/media from various commercial manufacturers and shows the permeability and corresponding silica and soda ($Na_2O$) chemistry from three of the major global diatomite producers, EP Minerals LLC, Imerys Filtration Minerals, and Showa Chemical Company. The calculated percent stoichiometry of soda to silica is the ratio of the mole oxide of soda (wt % $Na_2O$/M.W. $Na_2O$) to the mole oxide of silica (wt % $SiO_2$/M.W. $SiO_2$).

TABLE 1

Typical Stoichiometry of Sodium Oxide to Silica of Exemplary Conventional Commercial Diatomite Filter Aids

| Flux-Calcined Filtration Products | Permeability (millidarcy) | $SiO_2$ (wt %) | $Na_2O$ (wt %) | Stoichiometry of $Na_2O/SiO_2$ (%) |
|---|---|---|---|---|
| Celatom FW-6[1] | 500 | 92.7 | 2.8 | 2.9 |
| Celatom FW-20[1] | 2,000 | 92.5 | 2.9 | 3.0 |
| Celatom FW-50[1] | 3,500 | 91.0 | 3.4 | 3.6 |
| Celatom FW-80[1] | 10,000 | 90.4 | 3.7 | 4.0 |
| Hyflo SuperCel[2] | 1,000 | 90.1 | 2.8 | 3.0 |
| Celite 503[2] | 2,000 | 89.6 | 2.8 | 3.0 |
| Celite 545[2] | 4,000 | 89.6 | 3.0 | 3.0 |
| Kenite 5500[2] | 5,000 | 91.3 | 3.7 | 3.9 |
| Radiolite 600[3] | 1,200 | 90.4 | 3.5 | 3.7 |
| Radiolite 900S[3] | 5,000 | 90.5 | 3.1 | 3.3 |
| Radiolite 1100[3] | 8,500 | 89.1 | 4.1 | 4.5 |

[1]EP Minerals technical data sheet
[2]Celite Corporation technical data sheet
[3]Showa Chemicals Industry technical data sheet The silica content of all these flux-calcined products of the exemplary conventional diatomite filtration media is in the range of from about 89.0 wt % to about 93.0 wt % $SiO_2$ and the sodium oxide concentration ranges from about 2.8 wt % for the low permeability products to about 4.0 wt % for the fast flow rate products. In general, the stoichiometric ratio of sodium oxide to silica is in the range of from about 2.9% to about 4.0%, with the exception of Radiolite 1100 at about 4.5%.

The chemical inertness of the diatom silica and the accompanying intricate and porous structure give diatomite products unique commercial value in quality-sensitive filtration applications. Diatomite filtration products/media have been used for many years in liquid/solid separation in the food, beverage, and chemicals industries. Conventional diatomite media are used in the processing of wide range of fluids, including beverages, petroleum products and derivatives, chemicals, ingestible pharmaceuticals, agro-food intermediates, and sweeteners.

Diatomite may be used in a filtration process as a pre-coat or as a body feed or a combination of the two, depending on the nature of the material to be filtered and the type of filter employed. The principles of body feed filtration (BFF), which is a well-established process used for fluid-solid separations in the plasma fractionation and beverage industries, have been tested as a substitute cell culture harvesting solution. In a precoat-only system, a layer of filter aid is built up on the filter septum to protect against the blinding of particulate of the media by recirculating a filter aid slurry. In a body feed only system, small amounts of filter aid are regularly added to the liquid to be filtered together with the suspended particulates to be removed. This ensures that a new filtering surface is continuously formed that helps to entrap the suspended particulates and at the same time ensure a constant flow rate of the liquid. Large volumes of filtration media are used in the form of precoat-only in rotary vacuum filtration, and large volumes are also used in both precoating and body feed in pressure filtration systems. Some specialty pressure filtration applications, such as sake filtration use a precoat-only approach.

In both the precoat and body feed filtration applications, the diatomite filter aid product or media contacts the fluid being filtered. One of the negative aspects of using diatomaceous filtration media in solid-liquid separations is the release of extractable metals from the media into the fluid. The presence of high levels of soluble metals introduced by the diatomite media in these applications can affect the purity of the liquid product, as well as the stability and taste of the fluid being filtered. Therefore, conventional filter aid products, when used in food and beverage processing, are required to meet government requirements for purity, such as the US Food Chemicals Codex.

The control of soluble heavy metals such as lead, arsenic, iron, aluminum, etc. is important in life sciences separation processes where diatomite filtration media is used in processing premium fluids such as plasma fractions. As a result, in these applications, diatomite filtration media, which contribute reduced levels of impurities to the liquids being filtered, are preferred and are used in these applications. While some purified diatomite filtration media products have been developed and are used in these applications, the applications for, and need for, ever higher purity liquids, continue to grow, and there is a need for diatomite filtration products/media with improved purity.

Just as the extractable heavy metals contribution needs to be controlled in biological fluids, it has also been determined that the surface charge of the particles of the diatomite filtration media that contacts biological fluids is important in limiting the generation of unwanted contaminants in the fluid. One such contaminant is Prekallikrein activator (PKA), which is found in human albumin solutions and immunoglobulin solutions prepared from fractionated plasma that employs the use of diatomite filtration media. It is known that adverse events, including vasodilation and hypotension, may occur where albumin solutions are contaminated with significant levels of PKA and are infused into patients. This is of special concern since albumin may be administered as a plasma expander to counter hypovolemia and hence the treatment may exacerbate the existing problem. If present at high enough levels, PKA can release kallikrein and cause patients to go into shock. PKA is therefore normally removed by post fractionation chromatography and must be validated, and as such all blood products licensing authorities require manufacturers to measure PKA levels in each batch of final product before it can be released for patient care. For example, the European Pharmacopoeia guidelines limit PKA content in plasma products to levels of less than 35 IU/ml.

Accordingly, it would be desirable to provide ultra-low surface charge, high performance diatomite filtration media, which possess combinations of very low surface charge, very low extractable impurities per unit mass, very low centrifuged wet densities, and very high flux rates relative to density. Furthermore, other desirable features and characteristics of the particular compositions and associated analyzing methods will become apparent from the subsequent detailed description and the appended claims, taken in conjunction with the accompanying drawings and the preceding background.

BRIEF SUMMARY

Disclosed herein are exemplary embodiments of ultra-low surface charge biogenic silica filtration products obtained from flux-calcination of diatomaceous earth. The ultra-low surface charge filtration products of this disclosure function as filter aids for the filtration separation of various fluids and liquids. As such, in accordance with one exemplary embodiment, a diatomite filtration product includes flux-calcined diatomaceous earth, wherein the diatomite filtration product has: (1) an intricate and porous structure of diatomite, (2) a zeta potential in a range of from about −1.0 mV to about −6.0 mV within a pH range of from about 3.0 to about 8.0, and (3) a centrifuged wet density in a range of from about 0.176 g/ml to about 0.256 g/ml.

In accordance with further embodiments, the filtration product may have a permeability in the range of about 450 millidarcys and about 20,000 millidarcys. Furthermore, the filtration product may have a stoichiometric ratio of sodium oxide to silicon dioxide in a range of from about 5.0% to about 8.0%. Also, the filtration product may be generated using a fluxing agent selected from the group of sodium oxide, sodium carbonate, and sodium bicarbonate. Additionally, the filtration product may have USP extractable lead (Pb) of less than about 1 mg/kg of the filtration product. Furthermore, the filtration product may have USP extractable arsenic (As) of less than about 1 mg/kg of the filtration product. Still further, the filtration product may have USP extractable iron (Fe) of less than about 10 mg/kg the filtration product.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The present disclosure will hereinafter be described in conjunction with the following Drawing figures, wherein like numerals denote like elements, and wherein:

FIG. 2A is a flow diagram of a diatomite manufacturing process for ultra-low surface charge, high performance filtration media in accordance with the present disclosure; and FIG. 2B is a flow diagram of a diatomite manufacturing process for the purification of the ultra-low surface, high performance filtration media, made according to the process of FIG. 2A, to generate a very low extractable metals filtration product.

DETAILED DESCRIPTION

Figure 1:
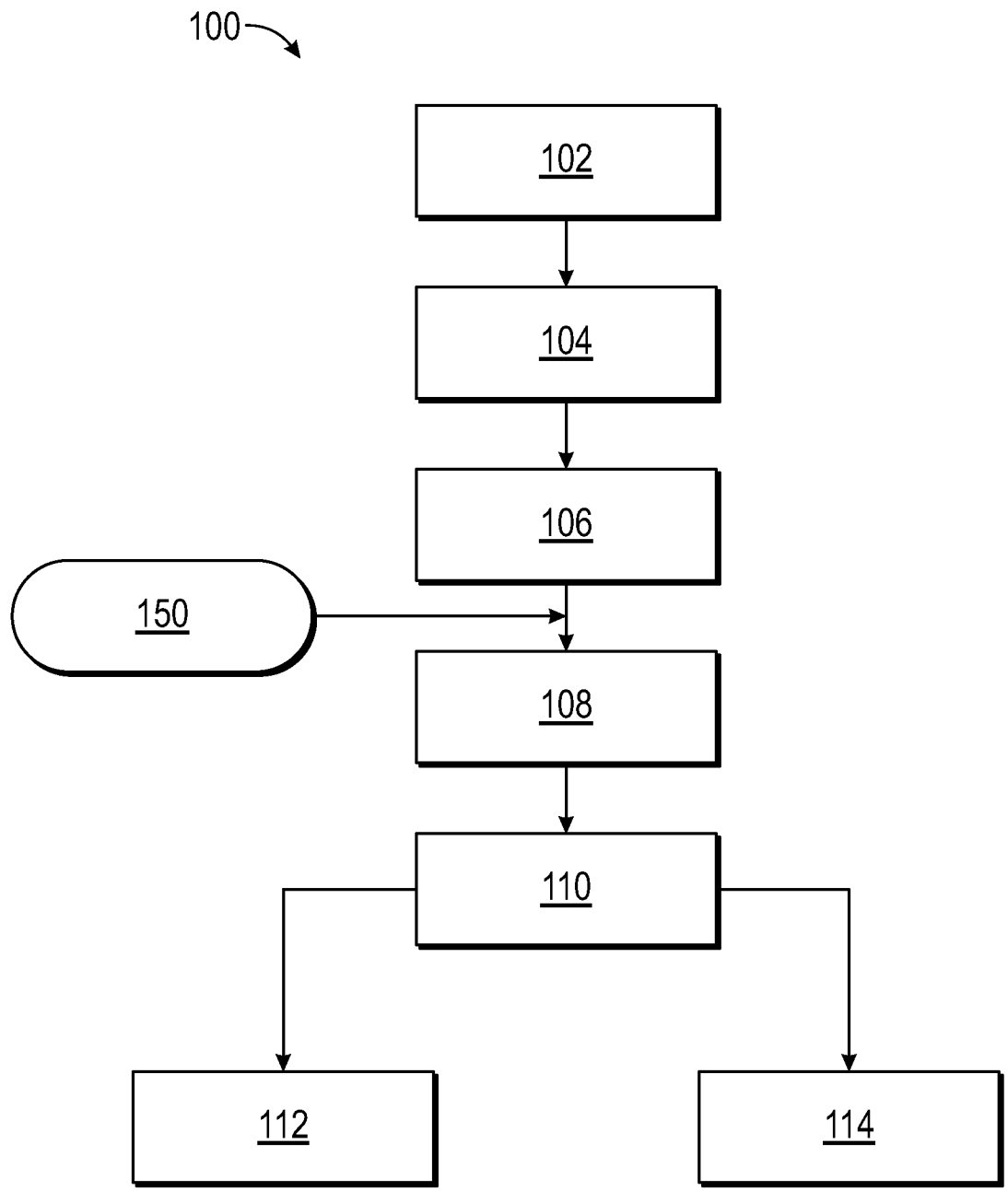
FIG. 1 is a flow diagram of a conventional (prior art) diatomite manufacturing process for filtration media products.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

This disclosure relates to ultra-low surface charge biogenic silica filtration products obtained from flux-calcination of diatomaceous earth. The ultra-low surface charge novel products of this disclosure are of utmost value in the field of life science and electronic chemicals where low surface charge filter aids are desired in the filtration separation of high value fluids and liquids. The novel filtration products of this disclosure have very low centrifuged wet densities and wide range of permeabilities, properties that provide for high filtration performance as related to decreased filter aid consumption and longer filtration cycle times. The novel filtration media have permeability in the range of 450 millidarcys and 20,000 millidarcys and centrifuged wet density in the range of 0.160 g/ml (10.0 lb/ft$^3$) and 0.256 g/ml (16.0 lb/ft$^3$).

Furthermore, this disclosure relates to products/media containing diatomaceous earth, the diatomaceous earth derived from ores that have been specifically selected for their naturally low centrifuged wet density and that have optionally been processed with acid treatments to reduce extractable heavy metals impurities. The low centrifuged wet density of the selected natural ore is also processed with calcination methods to generate an even lower calcined product and an ultra-low surface charge product. These product properties are also maintained after the acid purification treatment that provides for lower extractable metals. Another aspect of this disclosure is associated with the combination of higher permeability and lower density filtration media that provides for high particulate holding capacities and high flux rates.

Ultra-Low Surface Charge, High Performance Filtration Products/Media (Non-Acid Washed)

One of the two series of products of the present disclosure is the ultra-low surface charge, high performance filtration products/media including diatomite, which has gone through the conventional process of producing flux-calcined diatomite, but with elevated levels of soda fluxing agent in comparison to equivalent traditional diatomite products on the market. Unlike conventional diatomite flux-calcination, the use of elevated levels of soda ash in this disclosure is made possible by introducing 7-15% water into the diatomite calcination feed material to solubilize the soda flux powder to provide for a uniformly dispersed soda that will not create glass in the calcination process. The high concentration of sodium reacting with the diatomite silica generates a ceramic surface that has negligible charge. This product is not subjected to an acid washing process, which is typically used for significantly reducing extractable metals properties of diatomite products. These products/media are characterized by extremely low centrifuged wet densities and high filtration performance with long filtration cycle times and high flux rates relative to current commercially-available diatomite filtration media products.

This ultra-low surface charge and high performance diatomite filtration product provides for filter aid media that covers a range of product permeabilities from about 400 millidarcys to about 20,000 millidarcys. One aspect of these ultra-low surface charge diatomite filtration media is that, unlike conventional diatomite production, they are all made through a direct-run production, wherein no removal of the fine fraction of the product is required in order to achieve the high permeabilities. These direct-run product series are achieved through a combination of mechanical screening of the finer fraction and milling of the coarse fraction, employing the use of the Quadro Comil conical screen mill, available from Quadro Engineering.

TABLE 2, below, shows the range of physical and chemical properties of some of the exemplary ultra-low surface charge, high performance filtration media of this disclosure. They all have exceptionally low centrifuged wet densities, ranging from about 0.181 g/ml (11.3 lb/ft$^3$) to about 0.248 g/ml (15.5 lb/ft$^3$). The permeabilities for these low density products ranges from about 400 millidarcys to about 20,000 millidarcys, which is much higher than any conventional product on the market. The corresponding surface charge for these products is shown in TABLE 3, below. The surface charge is indicated by the zeta potential (ζ) of the filtration media particles at a given pH in a liquid medium, and it indicates that the zeta potential moves closer to the zero charge as the amount of soda flux increases to the optimum level. For these flux-calcined diatomite filtration media, the zeta potential of about −0.9 my to about −5.9 mV is the lowest that has been made in comparison to the prior art, by increasing the stoichiometric ratio of sodium oxide to silica to a minimum of 5.1%.

TABLE 2

Properties of Exemplary Ultra-low Surface Charge, High Performance Filtration Media

| $^1$Perm. (mD) | $^2$CWD (lb/ft3) | CWD (g/ml) | SiO$_2$ (%) | Na$_2$O (%) |
|---|---|---|---|---|
| 450 | 15.5 | 0.248 | 89.9 | 4.7 |
| 2767 | 11.3 | 0.181 | 89.9 | 4.7 |
| 7645 | 11.8 | 0.189 | 89.0 | 4.7 |
| 13,030 | 12.5 | 0.200 | 88.2 | 5.9 |
| 20,370 | 15.2 | 0.244 | 87.4 | 7.0 |

$^1$Product Permeability (millidarcy)
$^2$Centrifuge Wet Density

TABLE 3

Exemplary Ultra-low Surface Charge, High Performance Filtration Media

| Product | SiO$_2$ (wt %) | Na$_2$O (wt %) | $^1$Stoichiometry Na$_2$O/SiO$_2$ (%) | $^2$Zeta Potential (ζ) range At pH 4-8 (mV) |
|---|---|---|---|---|
| Conventional | 91.1 | 2.9 | 3.1 | −6.2 to −15.3 |
| Conventional | 89.9 | 3.5 | 3.8 | −5.8 to −9.9 |
| Novel | 89.0 | 4.7 | 5.1 | −3.8 to −5.9 |
| Novel | 88.2 | 5.9 | 6.5 | −1.8 to −2.5 |
| Novel | 87.4 | 7.0 | 7.8 | −0.9 to −2.3 |

$^1$Stoichiometric ratio of sodium oxide to silicon dioxide
$^2$Measure of surface charge Ultra-Low Surface Charge, High Performance Filtration Products/Media (Acid Washed)

The second series of products of the present disclosure is a purified version of the ultra-low surface charge and high performance filtration media including diatomite, which has gone through the aforementioned process of producing flux-calcined diatomite and with elevated levels of soda fluxing agent in comparison to equivalent traditional diatomite products on the market. This second series of products also undergo a purification process through acid treatment to significantly reduce the extractable metals without adversely impacting the high permeabilities and very low densities, while still maintaining the ultra-low surface charge property.

TABLE 4, below, shows the physical and some relevant extractable properties of the exemplary acid purified ultra-low surface charge and high performance diatomite filtration media of this disclosure. The purified products of this disclosure provide for filtration media that covers a range of product permeabilities from about 400 millidarcys to about 7,000 millidarcys, with extremely low extractable chemistries and very low densities. The centrifuged wet density for these purified products ranges from about 0.192 g/ml (12.0 lb/ft$^3$) to about 0.232 g/ml (14.5 lb/ft$^3$). The extractable heavy metals are very low, with Pb and As being less than about 0.1 ppm. The zeta potential also stays very low, even after the acid treatment process, in the pH range of about 4 to about 8, as shown in TABLE 5, below.

TABLE 4

Properties of Exemplary Purified Ultra-low Surface Charge, High Performance Filtration Media

| [1]Perm. (mD) | [2]CWD (g/ml) | CWD (lb/ft$^3$) | [3]Conduct. (μS/cm) | Fe (ppm) | Pb (ppm) | As (ppm) |
|---|---|---|---|---|---|---|
| 456 | 0.232 | 14.5 | 7 | 5.6 | 0.1 | 0.1 |
| 1667 | 0.192 | 12.0 | 6 | 5.6 | 0.1 | 0.1 |
| 4,814 | 0.208 | 13.0 | 8 | 3.5 | 0.1 | 0.1 |
| 7,110 | 0.223 | 13.9 | 7 | 2.5 | 0.1 | 0.1 |

[1]Product Permeability (millidarcy)
[2]Centrifuge Wet Density
[3]Conductivity

TABLE 5

Properties of Exemplary Purified Ultra-low Surface Charge, High Performance Filtration Media

| Perm. (mD) | CWD (g/ml) | CWD (lb/ft$^3$) | [1]Stoichiometry Na$_2$O/SiO$_2$ (%) | [2]Zeta Potential (ζ) range At pH 4-8 (mV) |
|---|---|---|---|---|
| 456 | 0.232 | 14.5 | 5.1 | −3.5 to −6.2 |
| 1667 | 0.192 | 12.0 | 5.1 | −3.8 to −4.3 |
| 4,814 | 0.208 | 13.0 | 6.5 | −1.8 to −2.5 |
| 7,110 | 0.223 | 13.9 | 7.8 | −1.3 to −2.1 |

[1]Stoichiometric ratio of sodium oxide to silicon dioxide
[2]Measure of surface charge Method of Preparing the Ultra-Low Surface Charge and High Performance Diatomite Filtration Media of the Present Disclosure The process for preparing the high performance diatomite filtration media of the present disclosure begins with the selection of ores that have very low natural centrifuge wet densities in comparison to that of natural ores used in the manufacturing of typical commercial filter aid products.

A unique aspect of the present disclosure is related to the calcination process where the amount of soda fluxing agent blended into the natural diatomite kiln feed is significantly higher in comparison to conventional diatomite production. Typically, the use of high amounts of fluxing agent in the flux-calcination process results in the generation of glassy particles. To avoid this glassy material formation and improve the efficiency of the fluxing agent, the technique of wet kiln feed fluidization is employed herein to solubilize the dry soda ash powder in the feed, which ensures an even distribution of the fluxing agent onto the surface of the diatomite particles. The solubilization of soda ash through the wet kiln feed fluidization technique also provides for a decrease in the bulk density of the ore prior to thermal processing. The net effect is a flux-calcined product that possesses very high concentration of Na$_2$O, very low centrifuged wet density, and higher permeability than could otherwise be achieve in comparison to similar conventional products.

U.S. Pat. No. 8,410,017 (Nyamekye et al.) teaches kiln feed pre-agglomeration with water for high density feed ores with large amounts of fine particulates and having a wet density of greater than about 25 lb/ft$^3$ and a permeability of less than about 10 millidarcys. The present disclosure, however, utilizes wet feed fluidization on ores that already have a very low density, in the range of from about 9 lb/ft$^3$ to about 15 lb/ft$^3$ (about 0.144 g/m to about 0.240 g/ml) and permeabilities in a range of from about 50 millidarcys to about 200 millidarcys. (Other prior art related to the addition of water to diatomaceous earth kiln feed to improve the product permeability after calcination is disclosed in U.S. Pat. No. 3,013,981 (Riede, R. G.) and U.S. Pat. No. 2,693,456 (Fennell, J. E.).)

Another unique aspect of this disclosure is related to the dispersion and sizing of the final product to maintain a low density product and minimize product degradation, which results in the high filtration media performance. Conventional diatomite products are dispersed using a milling fan when it comes out of the kiln into fine powder. The fines generated from this process step in classified to obtain filler product and the coarse fraction becomes the filtration product (see FIG. 1). This operation will usually end up increasing the density of the final filter aid product in comparison to the material out of the kiln. In this disclosure, the final product is made through a direct-run method where there is no fines removal and the kiln discharge is first screened through a centrifugal sifter at a given wedge wire screen size opening and the coarse discharge is then dispersed using the aforementioned Quadro Comil screening equipment. These two processing steps provide for a final product that has a centrifuged wet density that is as close as possible to the kiln discharge material. A lower flow rate product may be made by running the kiln discharge directly through the Quadro Comil equipment with a finer screen size to reduce the permeability.

Yet another unique aspect of the present disclosure is related to the high purity version of this low surface charge diatomite filtration media, which involves an acid treatment that results in very low extractable metals, making the product suitable for use in premium filtration applications like pharmaceuticals and electronics. The acid treatment is carried out to effect purification without impacting the low surface charge that was generated in the unique flux-calcination process, described above.

The process flow diagrams for manufacturing the ultra-low surface charge and high performance filtration media discussed herein are shown in FIGS. 2A and 2B. The manufacturing process 200 for the ultra-low surface charge, high performance filtration media is given FIG. 2A and the manufacturing process 300 in FIG. 2B shows the process flow diagram for the purification of the ultra-low surface, high performance filtration media to generate the very low extractable metals filtration product. The resulting product/media from the process 200 of FIG. 2A may be beneficially employed in the filtration of liquids that may not be sensitive to extractable metals, or they may be used as the raw material for manufacturing the high purity product/media series of the ultra-low surface charge, high performance filtration media, which may be employed in the filtration of pharmaceutical and electronic chemicals from the process 300 of FIG. 2B.

Beginning with process 200, block 210 includes selecting an appropriate low density diatomite crude ore based on the result of a centrifuge wet density (CWD) test. To identify a diatomite crude ore with the appropriate low centrifuged wet density, a representative sample of the crude ore is dried and hammer-milled to pass 80 mesh size. A representative sample is then taken from the milled powder and subjected to a centrifuged wet density test to ensure that the CWD meets the ore selection criteria of no greater than 0.256 g/ml (16 lb/ft$^3$). The standard operating procedure for carrying out the centrifuged wet density test is described below under the "Methods of Characterizing the Ultra-low Surface Charge and High Performance Diatomite Filtration Media" section of this disclosure.

In block 220, the low density crude ore identified in block 210 is crushed to provide ore sizes that are suitable for feeding into a flash dryer, which includes a hammer mill and heat injection. The flash drying is achieved by the simultaneous milling and heating of the moist ore with the net effect of generating a dry powder. To avoid over milling and preserve the particle integrity of the ore during the flash drying step, the flash dryer is configured to use an inline double cone static classifier. With this configuration, the ore is gently milled during the flash drying operation and any coarse particles that do not pass the particle size specification are returned to the mill through the coarse discharge of the inline double cone classifier.

In block 230, the resulting dried powder is subjected to dry heavy mineral impurities waste separation remove quartz, chert, sand, and other heavy foreign matter in the ore through the use of an air separator or air classifier.

Subsequent to block 230, the dried separated feed material is blended with a finely milled soda ash fluxing agent. Effective blending of the dense soda ash and the light diatomite powder is carried out through inline dilute phase pneumatic fluidization. The resultant blend is discharged into a ribbon blender and mixed with about 0.0 wt % to about 15 wt %, such as about 1.0 wt % to about 15 wt %, or about 2.0 wt % to about 15 wt %, or about 3.0 to about 15 wt %, or about 4.0 wt % to about 15 wt %, such as about 5.0 to about 15 wt %, of a fine mist of atomized water to wet the surface of the diatomite particles, the net effect being a moist fluidized kiln feed material with a lower, loose weight density. The calcination process (block 240) conditions are selected such that the kiln discharge product has permeability within the target permeability range for the desired filtration media. The kiln feed may be calcined at a temperature in a range of from about 704° C. to about 1177° C. (about 1300° F. to about 2150° F.) for a period ranging from about 15 minutes to about 100 minutes. The amount of fluxing agent (e.g., soda ash) used for generating products with permeabilities of about 400 millidarcys to about 20,000 millidarcys generally ranges from about 6 wt % to about 12 wt %, depending on the appropriate calcination temperature. The flux calcination process may be carried out in a directly-fired kiln in which the feed makes direct contact with the flame from the kiln burner.

The cooled product from block 240 is processed in block 250 using a staged milling and separation approach. A centrifugal sifter is used for the simultaneous dispersion and sifting of the finer particles at a given screen size opening. The coarser discharge from the sifter is then introduced into the Quadro Comil milling equipment, which is also furnished with a screen at a given size opening.

The resulting final product in block 260 is the ultra-low surface charge and high performance filtration media, having the material properties as described above, which is a combination of the sifter product and the milled product from the Quadro Comil.

Turning now to FIG. 2B, this flow diagram shows the manufacturing process 300 for the purified product grade of the ultra-low surface charge and high performance filtration media taught by this disclosure. This product grade provides for low extractable metals that may be important in the filtration of pharmaceutical fluids, for example, where low surface charge filtration media is also desired.

In block 310, the ultra-low surface charge and high performance filtration media of block 260 (FIG. 2A) is utilized as feed for process 300. There may be a slight reduction in the permeability of the purified product after the wet processing in manufacturing process 300.

In block 320, the powdered product of block 310 is transferred into a mix tank with an agitator that already has water by means of a diaphragm powder pump. The amount of water and powder added to the mix tank is such that a slurry of about 10 wt % to about 15 wt % solids is prepared for the subsequent acid treatment step in block 330. To minimize product degradation, the agitator is operated at the minimum speed, just enough to suspend the solids in the tank.

The slurry in block 320 is pumped into a glass reactor (or the like) in block 330 using a slurry diaphragm pump, which tends to minimize solids degradation. An inorganic acid, for example sulfuric acid, is added to the slurry in the reactor to generate an acid concentration of about 0.05 M to about 1.0 M. The polish leaching process is carried out by heating the slurry in the glass reactor through direct steam injection or heating the contents through the steam jacket of the reactor. The temperature for the leaching operation may have a retention time of about 20 minutes to about 100 minutes and the temperature may range from about 90° C. to about 100° C. under ambient pressure.

The leached slurry in block 330 is dewatered in block 340 using a pressure filter. The resulting filter cake in the pressure filter is thoroughly washed with deionized water to ensure that the conductivity of an about 10 wt % slurry of the dried product is less than about 20 µS/cm.

In block 350, the filter cake undergoes de-lumping and drying, and is dispersed into powder to obtain the final purified ultra-low surface charge and high performance diatomite filtration media of the present disclosure in block 360. To maintain the integrity of the diatom particles and preserve the centrifuged wet density of the dried product, drying of the cake may take place in a static dryer, typically a tray dryer and the dried cake may be dispersed with the use of a centrifugal sifter. Alternatively, a flash drying system may be used to obtain dried products with minimal product degradation.

Methods of Characterizing the Ultra-Low Surface Charge and High Performance Diatomite Filtration Media
—Surface Charge Measurement—Zeta Potential (symbol ζ)

All materials will spontaneously acquire a surface electrical charge when brought into contact with a polar medium like water, and the material interface may be negatively or positively charged. The commonly observed charging mechanism with all metal oxide surfaces (M-OH) such as diatomaceous earth (Si—OH) is related to the ionization of surface groups. This charging mechanism is also found in materials that contain carboxylic acid and amine-type functional groups. This latter category includes proteins, ionic polymers, and polyelectrolytes, many of which are widely utilized in pharmaceutical formulations. The ionization and/or dissociation of these groups depends strongly on the pH of the solution in which they are dispersed.

The Zeta potential is a physical property parameter which is related to the surface charge that all materials possess, or acquire, when suspended in a fluid and may be used to predict interactions with particle surfaces. The Zeta potential is the potential difference between the dispersion medium and the stationary layer of fluid attached to the dispersed particle, and it is widely used for quantification of the magnitude of the electrical surface charge.

Zeta potential measurements were made using a ZetaCAD streaming potential system. A total of 12 cm$^3$ of sample is packed into a PVC tube capped at both ends with a mesh to prevent particles from leaving the chamber. An electrolyte (5 mM KCl, 0.1 mM KCO$_3$), with the pH adjusted at different pH point using HCl or KOH, is passed through the sample column at increasing pressure conditions to calculate the streaming zeta potential using the Helmholtz-Smoluchowski equation. Three different conditions were used for each sample:

Condition 1: Pressure: 98 mBar to 490 mBar, in 98 mBar increment, 30 seconds steps Condition 2: Pressure: 98 mBar to 490 mBar, in 98 mBar increment, 60 seconds steps Condition 3: Pressure: 196 mBar to 588 mBar, in 98 mBar increment, 30 seconds steps These three conditions assess reproducibility of the measured value but are not true replicates.

The dry powder was gently packed into the cell and deionized water was added to collapse the powder into a wet paste. More dry powder was added, followed by deionized water, and this was repeated until the cell was completely filled with the wet powder paste. The cell was kept in a vertical state during the measurements.

—Permeability

The permeability of the filter cake (containing diatomite filtration product/media) is a measure of the flow rate of a standard liquid through a standard amount of the filtration product/media under standard conditions. Filtration using filter cakes containing diatomaceous earth is applied in the removal of particulate solids from fluids in industrial processes, and, while the permeability of the media is specifically used to measure the flow rate of a liquid through the media, the permeability of the media is also often correlated with the particle size exclusion capability of the media. In other words, media with higher permeabilities generally provide for higher flux through the filter cakes, but lower size exclusion (higher permeability media cannot remove as fine particles as coarser permeability media remove).

Permeability measurements of the filter cake samples described herein were performed using the Celatom Permeameter method disclosed in U.S. Pat. No. 5,878,374. The Celatom Permeameter is an automated instrument that forms a "filter cake" from a diatomite sample of known mass and then measures all required parameters needed to calculate permeability and wet bulk density. Tap water is used as the fluid medium in the measurement. The equations for calculating wet bulk density ($\rho$) in g/ml and permeability ($\beta$) in millidarcy are listed below:

$$\rho = \frac{m}{h * A}$$

$$\beta = \frac{V * h * \eta}{A * \Delta P * t} * 1000$$

where:
A=cross-sectional area of the cake (cm$^2$)
$\Delta P$=pressure drop across the cake (atm)
t=time of flow (s)
m=dry sample mass (g)
$\eta$=filtrate viscosity (cp)
V=filtrate volume (ml)
h=cake height (cm)

—Bulk Chemistry

Diatomaceous earth contains primarily the skeletal remains of diatoms and includes primarily silica, along with some minor amounts of impurities like magnesium, calcium, sodium, aluminum, and iron. The percentages of the various elements may vary depending on the source of the diatomaceous earth deposit. The biogenic silica found in diatomaceous earth is in the form of hydrated amorphous silica minerals, which are generally considered to be a variety of opal with a variable amount of hydrated water. Other minor silica sources in diatomaceous earth may come from finely disseminated quartz, chert, and sand. These minor silica sources, however, do not have the intricate and porous structure of the biogenic diatom silica species.

The bulk chemistry of diatomaceous earth ores and products determines the quality of the material and, in general, impacts the extractable metals properties of the filter aid product. XRF (X-ray fluorescence) spectroscopy is widely accepted as the analytical method of choice for determining the bulk chemistry of diatomaceous earth material and it is a non-destructive analytical technique used to determine the elemental composition of materials. XRF analyzers determine the chemistry of a sample by producing a set of characteristic fluorescent X-rays that is unique for that specific element, which is why XRF spectroscopy is an excellent technology for qualitative and quantitative analysis of material composition. In the testing of the bulk chemistry of the diatomaceous earth materials reported herein, 5 g of dried powdered sample and 1 g of X-ray mix powder binder are finely milled in a Spex® mill and then pressed into a pellet. The pellet is loaded into an automated Wavelength Dispersive (WD) XRF equipment, which has been previously calibrated with diatomaceous earth reference averages, to determine the bulk chemistry. To accommodate the natural loss of hydration within the silica structure, the total mineral contents for all the examples are reported on the Loss-on-Ignition (LOI) or on ignited basis for their respective high oxides. As used herein, "on ignited basis" means the mineral oxide content measured without the influence of the water of hydration within the silica structure. The results of the chemistry of the ultra-low surface charge and high performance diatomite filtration media and other competitive materials are presented in various sections of this disclosure.

—Centrifuged Wet Density

The wet density of a natural diatomaceous earth ore or product is a measure of the void volume available for capturing particulate matter during a filtration process. Wet densities are often correlated with unit consumption of diatomite filtration media. In other words, a diatomite filtration media possessing a low centrifuged wet density often provides for low unit consumption of the diatomite product in filtration operations.

Several methods have been used to characterize the wet density of diatomite filtration media products. The method used in this disclosure is the centrifuged wet density (CWD) and/or wet bulk density (WBD) as described under the Permeability test method. This CWD test method has been used frequently in the patent prior art, such as in U.S. Pat. Nos. 6,464,770; 5,656,568; and 6,653,255. In this test method, 10 ml of deionized water is first added to a 15 ml graduated centrifuge glass tube and 1 g of dry powder sample is loaded into the tube. The sample is completely dispersed in the water using a vortex-genie 2 shaker. A few milliliters of deionized water is then used to rinse the sides of the tube to ensure all particles are in suspension and the contents brought up to the 15 milliliters mark. The tube may then be centrifuged for 5 min at 2680 rpm on an IEC Centra® MP-4R centrifuge, equipped with a Model 221 swinging bucket rotor (International Equipment Company; Needham Heights, Mass., USA). Following centrifugation, the tube may be carefully removed without disturbing the solids, and the level (i.e., volume) of the settled matter may be noted by reading off at the graduated mark measured in cm$^3$. The centrifuged wet density of powder may be calculated by dividing the sample mass by the measured volume. The centrifuge wet density is determined as weight of the sample divided by the volume in g/ml. A conversion factor of 62.428 is applied to obtain the centrifuged wet density in lb/ft$^3$.

—Extractable Metals

Analysis of the filtrate sample solutions for iron (Fe), lead (Pb), and arsenic (As) content was carried out using Inductively Coupled Plasma (ICP) spectrophotometers or Graphite Furnace Atomic Absorption (GFAA). The choice of using ICP or GFAA is based on the limit-of-detection (LD) of the element to be measured. The ICP instrument used in this analysis was of the Atomic Emission Spectrometry (AES) type. It uses the intensity of light emitted from a flame at a particular wavelength to determine the quantity of an element in a sample. The wavelength of the atomic spectral line gives the identity of the element while the intensity of the emitted light is proportional to the number of atoms of the element. The sample analyte is introduced into the flame as a sprayed solution. The heat from the flame evaporates the solvent and breaks chemical bonds to create free atoms. The thermal energy also excites the atoms that subsequently emit light. Each element emits light at a characteristic wavelength, which is dispersed by a grating or prism and detected in the spectrometer.

GFAA, also known as electrothermal atomization (ETA), is a technique for improving the sensitivity and limit-of-detection for atomic absorption measurements. In this test, a small amount of the filtrate sample solution is placed inside a hollow graphite tube. This is resistively-heated in a temperature program to burn off impurities, atomize the analyte to form a plume of free metal vapor, and finally clean the tube. The free atoms will absorb light at frequencies or wavelengths characteristic of the element of interest (hence the name atomic absorption spectrometry). Within certain limits, the amount of light absorbed can be linearly correlated to the concentration of analyte present.

Reliable test methods have been established to determine the amount of acid soluble iron, lead, and arsenic in purified siliceous earth, especially diatomaceous earth products that are further purified after calcination as exemplified in this disclosure. The ICP spectrophotometer was employed in the analysis of acid soluble iron while the GFAA) spectroscopy was used in the determination of acid soluble lead and arsenic.

In the acid soluble iron test, the extraction of soluble iron was carried out by adding 2.0 g diatomaceous earth product sample to 50 ml of 0.1N hydrochloric acid (HCl) in a 250 ml flask. The content of the flask was swirled for 5 seconds every 10 minutes for a total of one hour. The solution was filtered through a Whatman #1 filter paper and some of the filtrate was collected into a 15 ml test tube for analysis with the ICP-OES instrument. The concentration of iron is calculated as:

Soluble Fe (ppm)=ICP Reading (ppm)×25 Dilution

The acid soluble analysis of heavy metals such as lead and arsenic from diatomaceous earth products is performed in accordance with the USP 40-NF 35 Monograph on Purified Siliceous Earth, USP 38-NF 33<233> (Elemental Impurities). In the extraction step, 10.0 g of the diatomite filtration product was added to 50 ml of 0.5N hydrochloric acid in a 250 mL flask. The flask was covered with watch glass and placed in a 70° C. hot water bath for 15 minutes. The flask content was filtered through a Whatman #3 filter paper and the filtrated was collected into a 100 mL volumetric flask. The solids on the filter paper was washed with three volumes of 10 mL de-ionized water that has been preheated to 70° C. Using deionized water, the total volume of the filtrate was brought up to a total of 100 mL solution.

For the analysis of lead or arsenic using the GFAA, a set of lead and arsenic standards were prepared and used to calibrate the spectrometer. 10 mL portions of the sample filtrates were then run to determine the concentration of the extractable metals in solution. The concentration of Pb or As in solution was then calculated as:

Soluble Metal (ppm)=(Metal (ppm) from GFAA)× Dilution Factor×40

ILLUSTRATIVE EXAMPLES

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

Various product examples of the ultra-low surface charge and high performance biogenic filtration media of the present disclosure are given below, showing products covering permeabilities of 600 millidarcys to 20,000 millidarcys. These examples are offered by way of illustration and not by way of limitation.

Methods of Preparing the Ultra-Low Surface Charge and High Performance Diatomite Filtration Media (Non-Acid Washed Grades)

A dried crude ore from the mine was hammer-milled to pass 80 mesh size and the centrifuged wet density test was carried out to ensure that density was less than 0.256 g/ml (16.0 lb/ft$^3$) in order for it to be used in preparing the feed for the process. The standard operating procedure for carrying out the centrifuged wet density test is described above in this disclosure under the "Methods of Characterizing the Ultra-low Surface Charge and High Performance Diatomite Filtration Media" section of this disclosure. The centrifuged wet density of the feed material used in preparing the ultra-high performance products/media (not acid washed versions) in this disclosure was 0.224 g/ml (14.0 lb/ft$^3$). The milled material was then classified with the use of a mechanical air separator to separate heavy mineral impurities such as quartz, chert, and sand from the liberated low density diatomite particles. The separator product was thoroughly blended with finely milled soda ash by employing a fluidizing shaker, followed by moisture addition with atomized water spray, which effectively reduced the loose weight density of the feed for the subsequent calcination process. The material was calcined in the muffle furnace at a given temperature and the product was then cooled to room temperature. The final filtration media was made by two methods, depending on the permeability of the target product. For very high permeability filtration media (>5000 millidarcys), the cooled product was first screened through a 50 mesh Tyler screen with some alumina ceramic media to aid in the dispersion of larger agglomerates. The screen oversize material was then dispersed using a Quadro Comil milling equipment that was fitted with a 35 mesh screen. Both the screened and milled fractions were then combined to obtain the final filtration media product. For low permeability filtration media (<5000 millidarcys), the cooled product was charged into the Quadro Comil milling equipment to obtain the final product. The process conditions for the calcination of the various filtration media are given in TABLE 6, below.

TABLE 6

Process Conditions for Preparing Exemplary Ultra-Low Surface and High Performance Diatomite Filtration Media (Non-Acid Washed Grades)

| Product | Calcination Temp. (° C.) | Calcination Time (min) | Soda Ash Addition (wt %) | Sodium Oxide (wt %) | Feed Water Addition (wt %) |
|---|---|---|---|---|---|
| Example 1 | 999 | 30 | 8.0-12.0 | 4.7-7.0 | 15 |
| Example 2 | 943 | 30 | 8.0-12.0 | 4.7-7.0 | 15 |
| Example 3 | 871 | 30 | 8.0-12.0 | 4.7-7.0 | 15 |
| Example 4 | 927 | 30 | 8.0-12.0 | 4.7-7.0 | 0 |

Example 1

The properties of exemplary products obtained from blending 8.0 to 12.0 wt % soda ash into the diatomite feed material and calcining at 999° C. to obtain the ultra-low surface charge and high performance filtration media are shown in TABLE 7, below. The zeta potential, which measures the surface charge of the product, is very low for all three product examples. The ideal low surface charge filtration media is zero mV and the surface charge of the products in TABLE 7 move closer to the zero potential in the pH range of 3 to 8 as the amount of the sodium oxide fluxing agent increases from 4.7 wt % to 7 wt %. The stoichiometric ratio of the sodium oxide to silica for these ultra-low surface charge products is between 5.1% to 7.8%. With the high fluxing agent and water addition to the calcination feed material, extremely high permeabilities and very low centrifuged wet densities are achieved. The combination of extremely low zeta potential of between −6.4 and −1.0 mV in the pH range of 3 and 8, very high permeability of up to 20,000 mD, and very low filter aid density provides for a filtration media that is unique in comparison to current commercially-available diatomite filtration media products and from the prior art.

TABLE 7

Exemplary Ultra-low Surface Charge Filtration Media of the Present Disclosure

| | Example A | Example B | Example C |
|---|---|---|---|
| Silica (%) | 89.0 | 88.2 | 87.4 |
| Sodium Oxide (%) | 4.7 | 5.8 | 7.0 |
| $Na_2O/SiO_2$ Stoichiometry | 5.1 | 6.4 | 7.8 |
| Zeta Potential at pH 3-8 (mV) | −4.9 to −6.3 | −3.9 to −4.4 | −1.0 to −2.4 |
| [1]Perm (mD) | 7,645 | 13,030 | 20,370 |
| [2]CWD (lb/ft$^3$) | 11.8 | 12.5 | 15.2 |

[1]Permeability of Product - millidarcys
[2]Centrifuged Wet Density (CWD)

Example 2

TABLE 8, below, shows the properties of three examples of the ultra-low surface charge, high performance diatomite filtration media (not acid washed) prepared with 8.0%, 10%, and 12.0% soda ash and at a calcination temperature of 943° C. with permeabilities in the range of 5,000 and 9,700 millidarcys. Unlike conventional commercially-available diatomite products, the filtration media of the present disclosure contain much higher sodium oxide concentrations. The reaction of $Na_2O$ and $SiO_2$ in the thermal calcination process to form sodium silicate seems to suppress the charge on the surface of the silica particles and helps to drive the zeta potential of diatomite particles close to zero. The high permeabilities of these products are accompanied by very low centrifuged wet densities, lower than that of any product of the prior art and any commercially available product of this product category.

TABLE 8

Exemplary Ultra-low surface charge Filtration Media of the Present Disclosure

| | Example A | Example B | Example C |
|---|---|---|---|
| Silica (%) | 89.0 | 88.2 | 87.4 |
| Sodium Oxide (%) | 4.7 | 5.8 | 7.0 |
| $Na_2O/SiO_2$ Stoichiometry | 5.1 | 6.4 | 7.8 |
| Zeta Potential at pH 3-8 (mV) | −4.6 to −6.1 | −3.9 to −4.2 | −0.9 to −2.3 |
| [1]Perm (mD) | 5,068 | 6,667 | 9,689 |
| [2]CWD (lb/ft$^3$) | 11.3 | 12.0 | 13.6 |

[1]Permeability of Product - millidarcys
[2]Centrifuged Wet Density (CWD)

Example 3

Physical and chemical properties of three exemplary products made by the thermal reaction of $Na_2O$ and $SiO_2$ at a calcination temperature of 871° C. are shown in TABLE 9, below. In all these examples, the permeabilities of the products at this much lower calcination temperature are reduced even though the surface charge remains the same. The surface charge is always proportional to the amount of $Na_2O$ present in the filtration media.

TABLE 9

Exemplary Ultra-low surface charge Filtration Media of the Present Disclosure

| | Example A | Example B | Example C |
|---|---|---|---|
| Silica (%) | 89.0 | 88.2 | 87.4 |
| Sodium Oxide (%) | 4.7 | 5.8 | 7.0 |
| $Na_2O/SiO_2$ Stoichiometry | 5.1 | 6.4 | 7.8 |

TABLE 9-continued

Exemplary Ultra-low surface charge Filtration Media of the Present Disclosure

|  | Example A | Example B | Example C |
|---|---|---|---|
| Zeta Potential at pH 3-8 (mV) | −4.8 to −6.4 | −3.8 to −4.2 | −1.0 to −2.5 |
| [1]Perm (mD) | 3,203 | 3,503 | 3,905 |
| [2]CWD (lb/ft³) | 10.9 | 12.0 | 13.1 |

[1]Permeability of Product - millidarcys
[2]Centrifuged Wet Density (CWD)

Example 4

Physical and chemical properties of three exemplary filtration media of the present disclosure are shown in TABLE 10, below, using 8.0 wt %, 10 wt % and 12.0 wt % soda ash in the feed preparation for the subsequent calcination process.

TABLE 10

Exemplary Ultra-low surface charge Filtration Media of the Present Disclosure

|  | Example A | Example B | Example C |
|---|---|---|---|
| Silica (%) | 89.0 | 88.2 | 87.4 |
| Sodium Oxide (%) | 4.7 | 5.8 | 7.0 |
| Na₂O/SiO₂ Stoichiometry | 5.1 | 6.4 | 7.8 |
| Zeta Potential at pH 3-8 (mV) | −4.7 to −6.3 | −3.9 to −4.1 | −1.0 to −2.3 |
| [1]Perm (mD) | 417 | 1,278 | 3,202 |
| [2]CWD (lb/ft³) | 13.9 | 13.3 | 13.9 |

[1]Permeability of Product - millidarcys
[2]Centrifuged Wet Density (CWD)

As demonstrated, the permeability of the products was kept very low even though the sodium oxide content was very high. The permeability range of from 417 millidarcys to 3,203 millidarcys was generated by employing dry blending of the soda ash and eliminating the water addition step, which will normally catalyze the reaction between $Na_2O$ and $SiO_2$ to generate higher permeabilities. The surface charge stayed very low at the lower and higher permeabilities with very low product densities in comparison to products from the prior art and any other commercially-available filtration media.

Methods of Preparing the Ultra-Low Surface Charge and High Performance Diatomite Filtration Media (Acid Washed Grades)

The examples of the acid washed grades of the ultra-low surface charge, high performance diatomite filtration media of the present disclosure were prepared using the non-acid washed grades of the ultra-low surface charge filtration media as the starting feed material. A slurry of the feed material was prepared and leached in a glass reactor using sulfuric acid under the process conditions shown in TABLE 11, below.

TABLE 11

Process Conditions for Leaching of the Filtration Media to Produce the Ultra-Low Surface Charge, High Purity Acid Washed Grade Products

| Leaching time (min) | Leaching Temp. (° C.) | Leaching Pressure (kPa) | Leaching Solids (wt %) | Sulfuric Acid Conc. (M) |
|---|---|---|---|---|
| 30-60 | 90-98 | 101.3 | 10-15 | 0.1-0.5 |

The feed material may also be optionally leached at elevated temperatures and pressures if desired. At the end of the leaching unit operation, the slurry was dewatered with a pressure filter and the resultant cake was thoroughly washed with deionized water inside the filter to ensure that the conductivity of a 10 wt % slurry of the dried filter cake is less than 20 µS/cm. The cake was dried and dispersed to obtain the high purity filtration media without altering the surface charge characteristics of the original diatomite filtration media.

Example 5

TABLE 12, below, shows the properties of exemplary ultra-low surface charge and high performance diatomite filtration media after acid purification. These exemplary products are characterized by very low surface charge in the pH range of 3 and 8 with the zeta potential in the range of only −1.2 and −2.5 mV as the as the sodium oxide content of the media increases to 7.0 wt %. The concentration of the extractable heavy metals lead and arsenic in the media are less than 1 ppm, below the detection limit of the analysis. The extractable iron content is also extremely low. These products cover a permeability range of from 7,100 to 4,600 mD with very low centrifuged wet densities in comparison to the any products of its kind in the prior art.

TABLE 12

Properties of Exemplary Ultra-Low Surface Charge and High Performance Diatomite Filtration Media

|  | Example A | Example B | Example C |
|---|---|---|---|
| Silica (wt %) | 89.0 | 88.2 | 87.4 |
| Sodium Oxide (wt %) | 4.7 | 5.8 | 7.0 |
| Na₂O/SiO₂ Stoichiometry | 5.1 | 6.4 | 7.8 |
| Zeta Potential at pH 3-8 (mV) | −4.4 to −6.2 | −3.7 to −4.6 | −1.2 to −2.5 |
| [1]Perm (mD) | 7,110 | 6,267 | 4661 |
| [2]CWD (lb/ft³) | 14.1 | 13.9 | 13.0 |
| Fe (ppm) | 3.2 | 2.5 | 2.1 |
| Pb (ppm) | <1.0 | <1.0 | <1.0 |
| As (ppm) | <1.0 | <1.0 | <1.0 |
| Conductivity (µS/cm) | 8.5 | 7.3 | 6.9 |

[1]Permeability of Product - millidarcys
[2]Centrifuged Wet Density (CWD)

Example 6

The properties of the exemplary ultra-low surface charge filtration media with permeabilities in the range of 3000 and 6,000 millidarcys are shown in TABLE 13, below. These exemplary ultra-low surface charge filtration media have a very low centrifuged wet density, which provides for the high filtration performance. The conductivity is less than 10 µS/cm and the extractable metals content is very low in all of these products. The range of surface charge for these products is dictated by the stoichiometric ratio of sodium oxide to silica and the zeta potential becomes lower as the ratio increases.

TABLE 13

Properties of Exemplary Ultra-Low Surface Charge and High Performance Diatomite Filtration Media

|  | Example A | Example B | Example C |
|---|---|---|---|
| Silica (%) | 89.0 | 88.2 | 87.4 |
| Sodium Oxide (%) | 4.7 | 5.8 | 7.0 |

TABLE 13-continued

Properties of Exemplary Ultra-Low Surface Charge and High Performance Diatomite Filtration Media

|  | Example A | Example B | Example C |
|---|---|---|---|
| $Na_2O/SiO_2$ Stoichiometry | 5.1 | 6.4 | 7.8 |
| Zeta Potential at pH 3-8 (mV) | −4.8 to −6.4 | −3.9 to −4.8 | −1.0 to −2.6 |
| [1]Perm (mD) | 3215 | 4814 | 5925 |
| [2]CWD (lb/ft$^3$) | 12.8 | 13.0 | 13.5 |
| Fe (ppm) | 6.0 | 6.2 | 6.0 |
| Pb (ppm) | <1.0 | <1.0 | <1.0 |
| As (ppm) | <1.0 | <1.0 | <1.0 |
| Conductivity (µS/cm) | 8 | 8 | 7.1 |

[1]Permeability of Product - millidarcys
[2]Centrifuged Wet Density (CWD)

Example 7

The characteristics of exemplary purified ultra-low surface charge, high performance diatomite filtration media in the permeability range of 450 millidarcys and 2,500 millidarcys are shown in TABLE 14, below. These exemplary products show very low conductivity, low extractable metals and ultra-low surface charge.

TABLE 14

Properties of Exemplary Ultra-Low Surface Charge and High Performance Diatomite Filtration Media

|  | Example A | Example B | Example C |
|---|---|---|---|
| Silica (%) | 89.0 | 88.2 | 87.4 |
| Sodium Oxide (%) | 4.7 | 5.8 | 7.0 |
| $Na_2O/SiO_2$ Stoichiometry | 5.1 | 6.4 | 7.8 |
| Zeta Potential at pH 3-8 (mV) | −5.2 to −6.5 | −3.6 to −4.6 | −0.9 to −2.3 |
| [1]Perm (mD) | 456 | 1,078 | 2,480 |
| [2]CWD (lb/ft$^3$) | 15.2 | 14.2 | 14.5 |
| Fe (ppm) | 2.9 | 2.6 | 2.1 |
| Pb (ppm) | <1.0 | <1.0 | <1.0 |
| As (ppm) | <1.0 | <1.0 | <1.0 |
| Conductivity (µS/cm) | 6 | 7 | 4 |

[1]Permeability of Product - millidarcys
[2]Centrifuged Wet Density (CWD)

As such, the present disclosure has provided embodiments of ultra-low surface charge, high performance diatomite filtration media, which possess unique combinations of very low surface charge, very low extractable impurities per unit mass, very low centrifuged wet densities, and very high flux rates relative to density. The very low centrifuged wet densities of this biogenic filtration media provide for significantly reduced unit consumption, in terms of mass consumed per unit of fluid filtered. The combination of reduced unit consumption and ultra-low surface charge may be advantageous in plasma fractionation processes by providing a compounding effect in minimizing the overall charged particles that contacts the fluid to generate the unwanted PKA contaminant. The net effect is a diatomite filtration media that provides the performance needed for keeping PKA content of plasma products below the desire levels and eliminating the need for secondary chromatographic process to reduce the PKA levels to below regulatory limits.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the inventive compositions and methods. It is understood that various changes may be made in the function and arrangement of elements described in an exemplary embodiment without departing from the scope of the invention as set forth in the appended claims.

What is claimed is:

1. A diatomite filtration product comprising flux- calcined diatomaceous earth, wherein the diatomite filtration product has:
    (1) an intricate and porous structure of diatomite,
    (2) a zeta potential in a range of from about −1.0 mV to about −6.0 mV within a pH range of from about 3.0 to about 8.0, and
    (3) a centrifuged wet density in a range of from about 0.176 g/ml to about 0.256 g/ml,
    wherein the filtration product is generated by preparing a blend by blending dried diatomaceous earth comprising a centrifuged wet density of not greater than 0.256 g/ml with about 6 weight percent to about 12 weight percent of a fluxing agent based on the total weight of the blend and thermally sintering the blend to form the flux-calcined diatomaceous earth,
    wherein the blend comprises a stoichiometric ratio of fluxing agent to silicon dioxide of at least 5.0%, wherein water is introduced into the blend in an amount of 7-15 weight percent based on the total weight of the blend to form a dispersion of diatomaceous earth, water, and fluxing agent.

2. The filtration product of claim 1 having a permeability in a range of from about 450 millidarcys to about 20,000 millidarcys.

3. The filtration product of claim 1, wherein the blend has a stoichiometric ratio of sodium oxide to silicon dioxide in a range of from about 5.0% to about 8.0%.

4. The filtration product of claim 1, wherein the fluxing agent is selected from the group consisting of sodium oxide, sodium carbonate, and sodium bicarbonate.

5. The filtration product of claim 1 having USP extractable lead (Pb) of less than about 1 mg/kg of filtration product.

6. The filtration product of claim 1 having USP extractable arsenic (As) of less than about 1 mg/kg of filtration product.

7. The filtration product of claim 1 having USP extractable iron (Fe) of less than about 10 mg/kg filtration product.

8. The filtration product of claim 1, wherein the dried diatomaceous earth comprises a centrifuged wet density in the range from about 0.144 g/ml to about 0.240 g/ml.

* * * * *